US011993081B2

(12) United States Patent
Shimamura

(10) Patent No.: US 11,993,081 B2
(45) Date of Patent: May 28, 2024

(54) HEAD SYSTEM, LIQUID DISCHARGE DEVICE, AND METHOD OF DISCHARGING LIQUID

(71) Applicant: BROTHER KOGYO KABUSHIKI KAISHA, Nagoya (JP)

(72) Inventor: Yasuhiro Shimamura, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 60 days.

(21) Appl. No.: 17/811,431

(22) Filed: Jul. 8, 2022

(65) Prior Publication Data

US 2023/0010691 A1 Jan. 12, 2023

(30) Foreign Application Priority Data

Jul. 12, 2021 (JP) ................................ 2021-115216

(51) Int. Cl.
*B41J 2/045* (2006.01)
*B41J 2/14* (2006.01)

(52) U.S. Cl.
CPC ....... *B41J 2/04541* (2013.01); *B41J 2/04586* (2013.01); *B41J 2002/14491* (2013.01)

(58) Field of Classification Search
CPC ................ B41J 2/04541; B41J 2/04586; B41J 2002/14491
See application file for complete search history.

(56) References Cited

U.S. PATENT DOCUMENTS 10,661,560 B2 * 5/2020 Nakajima ............ B41J 2/04586
2004/0046830 A1 3/2004 Mitsuzawa
2018/0345696 A1 * 12/2018 Kodaira ................ B41J 2/0457

FOREIGN PATENT DOCUMENTS

| | | | |
|---|---|---|---|
| JP | 2001-277658 | A | 10/2001 |
| JP | 2004-25551 | A | 1/2004 |
| JP | 2009241379 | A | 10/2009 |
| JP | 2010120328 | A | 6/2010 |
| WO | 2009/128351 | A1 | 10/2009 |

OTHER PUBLICATIONS

Notice of Reasons for Refusal dated Dec. 26, 2023 received from the Japanese Patent Office in corresponding application JP 2021-115216 together with English language translation.

* cited by examiner

*Primary Examiner* — Sharon Polk
(74) *Attorney, Agent, or Firm* — Scully, Scott, Murphy & Presser, PC

(57) ABSTRACT

There is provided a head system includes: a main controller; a plurality of head units; and sub-controllers respectively connected to at least one of the plurality of head units. The sub-controllers are each serially connected via a wiring. The wiring includes: a first communication path for transmitting an image signal; and a second communication path that transmits a discharge timepoint signal indicating a discharge timepoint. Each of the sub-controllers is configured to cause liquid corresponding to an image indicated by the image signal that has been received through the first communication path to be discharged from nozzles of one of the head units to which each of the sub-controllers have been connected, at a discharge timepoint indicated by the discharge timepoint signal that has been received through the second communication path.

12 Claims, 8 Drawing Sheets

HEAD SYSTEM, LIQUID DISCHARGE DEVICE, AND METHOD OF DISCHARGING LIQUID

CROSS REFERENCE TO RELATED APPLICATION

The present application claims priority from Japanese Patent Application No. 2021-115216 filed on Jul. 12, 2021, the disclosure of which is incorporated herein by reference in its entirety.

BACKGROUND

The present technology relates to a head system, a liquid discharging device, and a method of discharging liquid, that discharge liquid from nozzles.

There is proposed a liquid drop discharging system including: a control unit; a serially connected plurality of head drive units; and a conveying unit that generates a movement amount signal indicating a movement amount of a print medium. Based on an image signal and discharge timing signal from the control unit, the plurality of head drive units respectively outputs drive signals to a plurality of heads, and cause ink to be discharged from each of the heads. The conveying unit outputs the movement amount signal to the control unit, and, based on the movement amount signal, the control unit generates the discharge timing signal. The head drive units cause ink corresponding to the image signal to be discharged from the heads at a timing indicated by the discharge timing signal.

SUMMARY

The image signal and discharge timing signal are sequentially transferred from the head drive unit positioned at one end, of the serially connected plurality of head drive units to the head drive unit positioned at the other end, of the serially connected plurality of head drive units. In the case of the discharge timing signal being transferred after the image signal, there is a risk that volume of the image signal will be larger than that of the discharge timing signal, and that a timepoint when the discharge timing signal is received by the head drive units will be delayed.

The present disclosure, which was made in view of such circumstances, has an object of providing a head system, a liquid discharging device, and a method of discharging liquid, that enable delay in discharge timing to be suppressed.

According to an aspect of the present disclosure, a head system includes: a main controller; a plurality of head units having nozzles; and a plurality of sub-controllers respectively connected to at least one of the plurality of head units. Each of the sub-controllers is serially connected via a wiring. The wiring includes: a first communication path configured to transmit an image signal; and a second communication path configured to transmit a discharge timepoint signal indicating a discharge timepoint when liquid is to be discharged from the nozzles. The second communication path differs from the first communication path. The first communication path is configured to transmit the image signal from the main controller to each of the sub-controllers. The second communication path is configured to transmit the discharge timepoint signal to each of the sub-controllers. Each of the sub-controllers is configured to control one of the head units, to which each of the sub-controllers have been connected, to discharge liquid corresponding to an image indicated by the image signal that has been received through the first communication path from the nozzles of the one of the head unit, at a discharge timepoint indicated by the discharge timepoint signal that has been received through the second communication path.

DETAILED DESCRIPTION

First Embodiment

Figure 1:
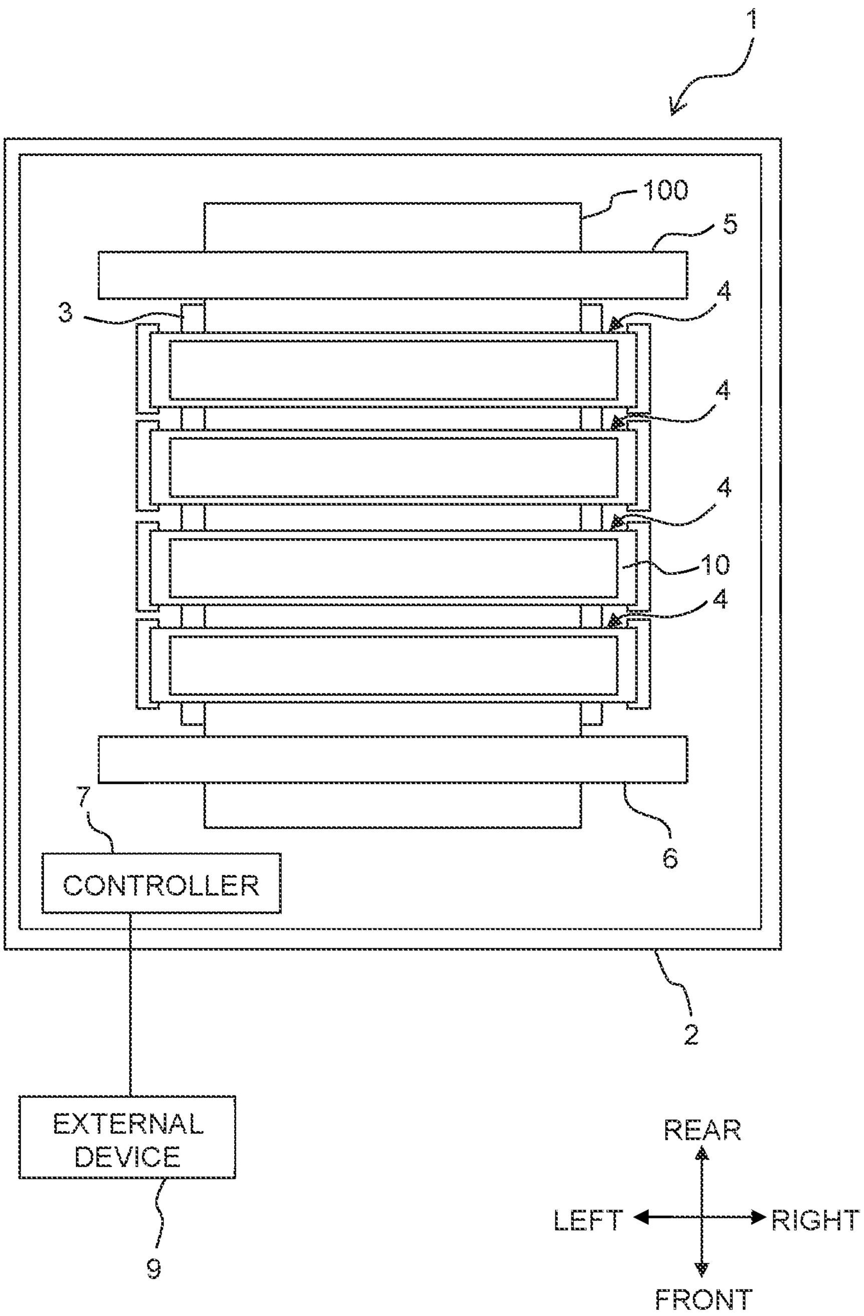
FIG. 1 is a schematic plan view of a printer.
Figure 2:
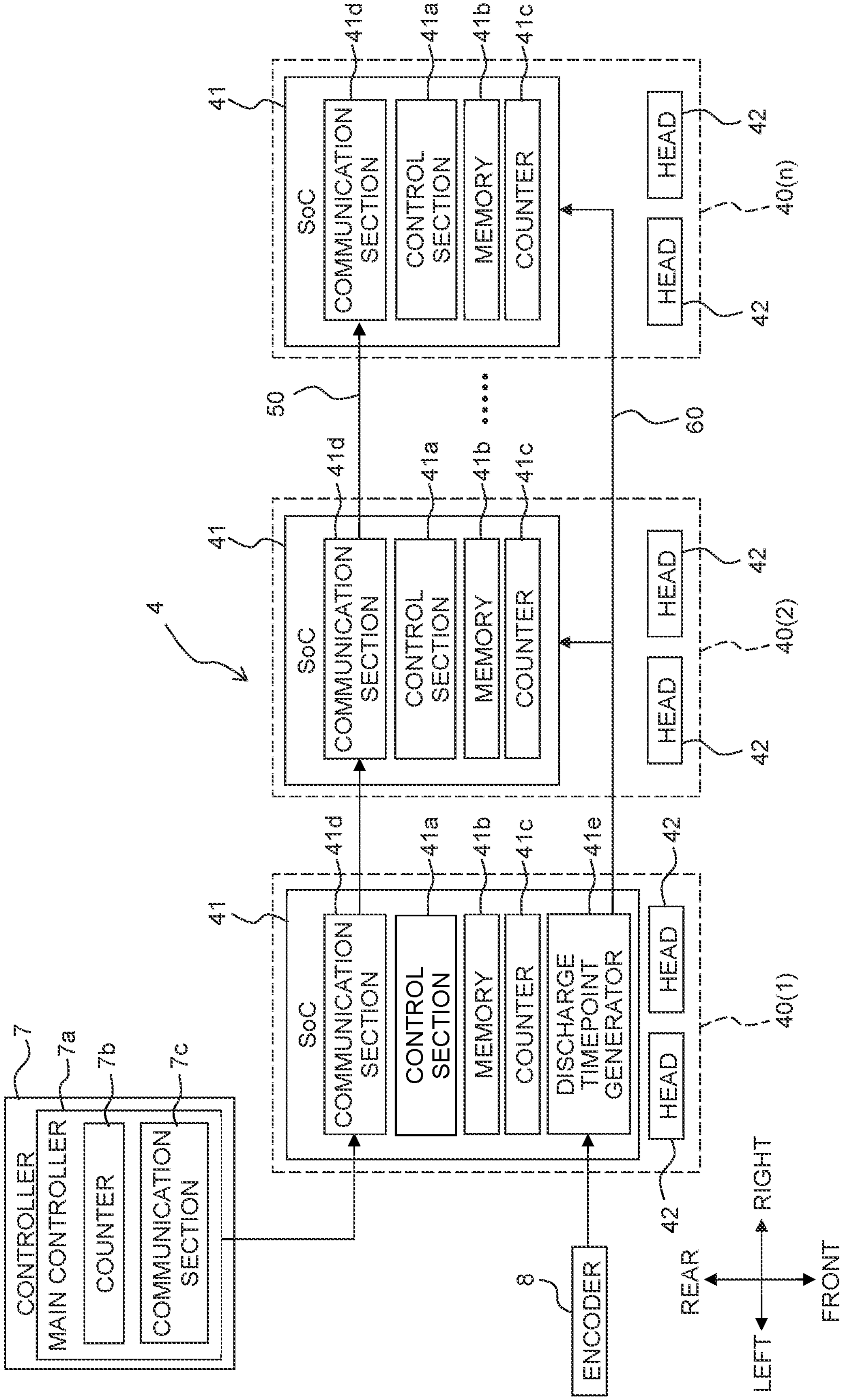
FIG. 2 is a block diagram of a controller, an encoder, and an ink jet head.
Figure 3:
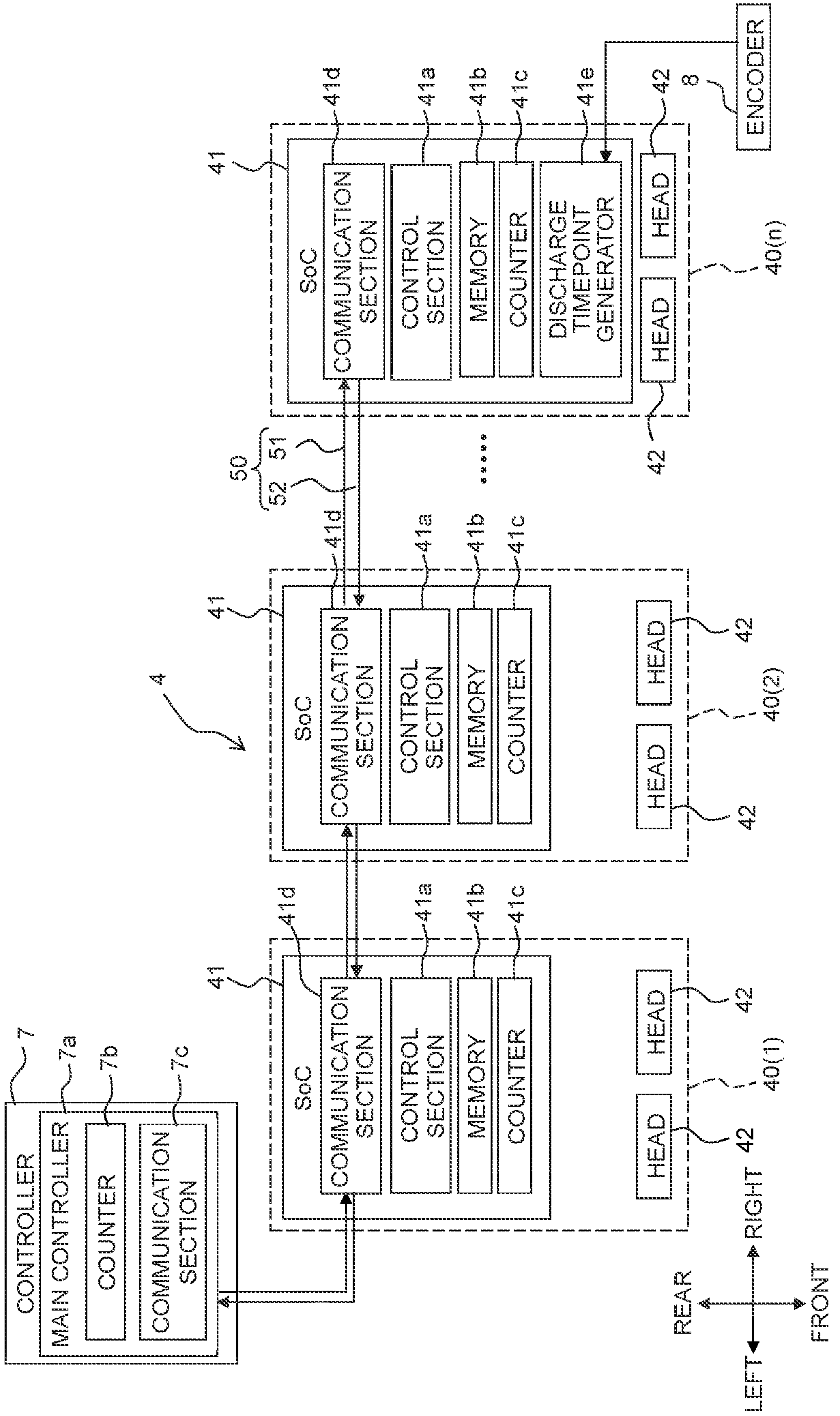
FIG. 3 is a block diagram of a controller, an encoder, and an ink jet head.

The present disclosure will be described below based on drawings depicting a printer according to a first embodiment. In FIG. 1, a conveying direction of a recording sheet 100 corresponds to a front-rear direction of a printer 1. Moreover, a width direction of the recording sheet 100 corresponds to a left-right direction of the printer 1. Moreover, a direction orthogonal to the front-rear direction and left-right direction, that is, a direction perpendicular to a paper surface of FIG. 1 corresponds to an up-down direction of the printer 1. The printer 1 corresponds to a liquid discharging device.

As depicted in FIG. 1, the printer 1 includes a platen 3 housed within a case 2, four ink jet heads 4, two conveying rollers 5, 6, and a controller 7. The printer 1 corresponds to the liquid discharge device, and the conveying rollers 5, 6 correspond to a conveyor.

The recording sheet 100 passes over an upper surface of the platen 3. The four ink jet heads 4 are aligned in the conveying direction above the platen 3. Each of the ink jet heads 4 is a so-called line-type head. The ink jet head 4 has ink supplied to it from an ink tank (not illustrated). The four ink jet heads 4 are supplied with inks of different colors.

As depicted in FIG. 1, the two conveying rollers 5, 6 are respectively disposed on a rear side and front side of the platen 3. The two conveying rollers 5, 6, which are each driven by an unillustrated motor, convey frontwards the recording sheet 100 on the platen 3.

The controller 7 includes an FPGA, an EEPROM, and a RAM and the like. Note that the controller 7 may include a CPU or an ASIC. The controller 7, which is data-communicably connected to an external device 9 such as a PC, controls each section of the printer 1 based on print data sent from the external device 9.

The controller 7 includes a main controller 7*a*. The main controller 7*a* includes a counter 7*b* and a communication section 7*c*. The ink jet head 4 includes a plurality of head modules 40. The plurality of head modules 40 is arranged in line in the left-right direction.

The plurality of head modules 40 includes, for example, n head modules, that is, a first head module 40(1) through $n^{th}$ head module 40(*n*) (where n is a natural number). The first head module 40(1) is positioned furthest to the left, and the $n^{th}$ head module 40(*n*) is positioned furthest to the right.

The first head module 40(1) through $n^{th}$ head module 40(*n*) each includes an SoC 41 and a plurality of heads 42. The SoC 41 corresponds to a sub-controller. The head 42 has a plurality of nozzles. The SoC 41 includes a control section 41*a*, a memory 41*b*, a counter 41*c*, and a communication section 41*d*. The control section 41*a* controls operation of each SoC 41. The memory 41*b* is a rewritable nonvolatile memory such as an EPROM or an EEPROM, for example. The SoC 41 of the first head module 40(1) further includes a discharge timepoint generator 41*e*. The SoCs 41 of the second head module 40(2) through $n^{th}$ head module 40(*n*) do not include the discharge timepoint generator 41*e*. Hereafter, the SoCs 41 of the first head module 40(1) through $n^{th}$ head module 40(*n*) will be called SoC(1) through SoC(n).

The communication section 7*c* and each of the communication sections 41*d* are serially connected by a first wiring 50. The communication section 7*c* transmits to the communication section 41*d* of SoC(1) an image signal included in the print data. The communication section 41*d* of SoC(1) transfers the image signal to the communication section 41*d* of SoC(2), and the communication section 41*d* of SoC(2) transfers the image signal to the communication section 41*d* of SoC(3). In this way, the image signal is sequentially transferred to the communication section 41*d* of SoC(n).

The image signal includes: an identifier of each of SoC(1) through SoC(n); and print information associated with each identifier. The control sections 41*a* of SoC(1) through SoC (n) acquire from the received image signal image information associated with their own identifier.

The conveying rollers 5, 6 include an unillustrated motor, and a rotating shaft of the motor is provided with an encoder 8. The encoder 8 corresponds to a detecting unit. The encoder 8, the discharge timepoint generator 41*e*, and SoC (2) through SoC(n) are serially connected by a second wiring 60. The encoder 8 detects rotational position of the motor as the detection value, and outputs the detected rotational position of the motor as the detection value to the discharge timepoint generator 41*e*.

The discharge timepoint generator 41*e* generates a discharge timepoint signal when ink is to be discharged by the head 42 of each of the first head module 40(1) through $n^{th}$ head module 40(*n*), based on a detection value with which the discharge timepoint generator 41*e* has been inputted. The discharge timepoint generator 41*e* transmits to SoC(2) through SoC(n) a discharge timepoint signal indicating the generated discharge timepoints. That is, the discharge timepoint signal is transmitted from the discharge timepoint generator 41*e* to each of the SoCs 41 other than SoC(1), through the second wiring 60. The discharge timepoint signal includes: an identifier of each of SoC(2) through SoC(n); and a count value which is associated with each identifier, and that indicates a timepoint when ink is to be discharged from the head 42. SoC(1) acquires the discharge timepoint signal from the discharge timepoint generator 41*e*, and SoC(2) through SoC(n) receive the discharge timepoint signal. SoC(1) through SoC(n) acquire from the acquired or received discharge timepoint signal the count value associated with their own identifier.

SoC(1) through SoC(n) cause ink corresponding to acquired image information to be discharged from the head 42 when a value of the counter 41*c* has reached the acquired count value, that is, when the value of the counter 41*c* has reached a discharge timepoint indicated by the discharge timepoint signal.

The printer 1 according to the first embodiment includes: the first wiring 50 that serially connects the main controller 7*a* and plurality of SoCs 41; and the second wiring 60 that differs from the first wiring 50. The first wiring 50 is used in transmission of the image signal, and the second wiring 60 is used in transmission of the discharge timepoint signal. Volume of the image signal is larger than that of the discharge timepoint signal. However, since a different communication path from that of the image signal is used in transmission of the discharge timepoint signal, delay of the discharge timepoint signal can be suppressed.

The SoC 41 including the discharge timepoint generator 41*e* is not limited to SoC(1). Any of SoC(2) through SoC(n) may include the discharge timepoint generator 41*e*, instead of SoC(1). A circuit including a discharge timepoint generator may be separately provided between the encoder 8 and SoC(1), rather than the discharge timepoint generator 41*e* being provided in SoC(1). In this case, the discharge timepoint signal is transmitted from the circuit to SoC(1) through the second wiring 60. Note that in order to suppress that wiring between the encoder 8 and discharge timepoint generator 41*e* gets lengthy, the discharge timepoint generator 41*e* is preferably included in the head module 40 closest to the encoder 8.

Second Embodiment

The present disclosure will be described below based on a drawing depicting a printer 1 according to a second embodiment. Configurations of the second embodiment that are similar to in the first embodiment will be assigned with the same symbols as in the first embodiment, and their detailed descriptions omitted.

The printer 1 according to the second embodiment differs from that of the first embodiment in not including the second wiring 60. Moreover, whereas in the first embodiment, SoC(1) included the discharge timepoint generator 41*e*, in the second embodiment, SoC(n) includes the discharge timepoint generator 41*e*.

The communication section 7*c* and each of the communication sections 41*d* are serially connected by the first wiring 50. The first wiring 50 is a communication cable capable of bidirectional communication. The first wiring 50 has a first communication path 51 and a second communication path 52.

The first communication path 51 has: a first transmission start terminal positioned at one of ends of the first wiring 50 and connected to the main controller 7*a*; and a first transmission finish terminal positioned at the other of the ends of the first wiring 50 and connected to SoC(n). The second communication path 52 has: a second transmission start terminal positioned at the other of the ends of the first wiring 50 and connected to SoC(n); and a second transmission finish terminal positioned at the one of the ends of the first wiring 50 and connected to the main controller 7*a*.

The first communication path 51 is a path directed from the main controller 7*a* to SoC(n), and the second communication path 52 is a path directed from SoC(n) to the main controller 7*a*.

The image signal is sequentially transmitted to the first transmission start terminal, SoC(1) through SoC(n−1), the first transmission finish terminal, and SoC(n) from the main controller 7*a*, through the first communication path 51. Moreover, the discharge timepoint signal is sequentially transmitted to the second transmission start terminal, SoC (n−1) through SoC(1), the second transmission finish terminal, and the main controller 7*a* from SoC(n), through the second communication path 52.

The encoder 8, discharge timepoint generator 41*e*, SoC(1) through SoC(n−1), and main controller 7*a* are serially connected by the second communication path 52. The encoder 8 detects rotational position of the motor, and outputs the detected rotational position of the motor to the discharge timepoint generator 41*e*.

The discharge timepoint generator 41*e* generates a discharge timepoint when ink is to be discharged by the head 42 of each of the first head module 40(1) through $n^{th}$ head module 40(*n*), based on a detection value with which the discharge timepoint generator 41*e* has been inputted. The discharge timepoint generator 41*e* uses the second communication path 52 to transmit to SoC(1) through SoC(n−1) a discharge timepoint signal indicating the generated discharge timepoints. The discharge timepoint signal includes: an identifier of each of SoC(1) through SoC(n); and a count value which is associated with each identifier, and that indicates a timepoint when ink is to be discharged from the head 42. SoC(n) acquires the discharge timepoint signal from the discharge timepoint generator 41*e*, and SoC(1) through SoC(n−1) receive the discharge timepoint signal. SoC(1) through SoC(n) acquire from the acquired or received discharge timepoint signal the count value associated with their own identifier.

SoC(1) through SoC(n) cause ink corresponding to acquired image information to be discharged from the head 42 when a value of the counter 41*c* has reached the acquired count value, that is, when the value of the counter 41*c* has reached the discharge timepoint indicated by the discharge timepoint signal.

In the printer 1 according to the second embodiment, the communication cable capable of bidirectional communication is used for transmission of the image signal and the discharge timepoint signal, so increase in the number of wirings can be suppressed. Moreover, since a transferring direction of the image signal and a transferring direction of the discharge timepoint signal are reversed with respect to each other, it becomes possible for transfer of the discharge timepoint signal to be performed without waiting for completion of transfer of the image signal.

Figure 4:
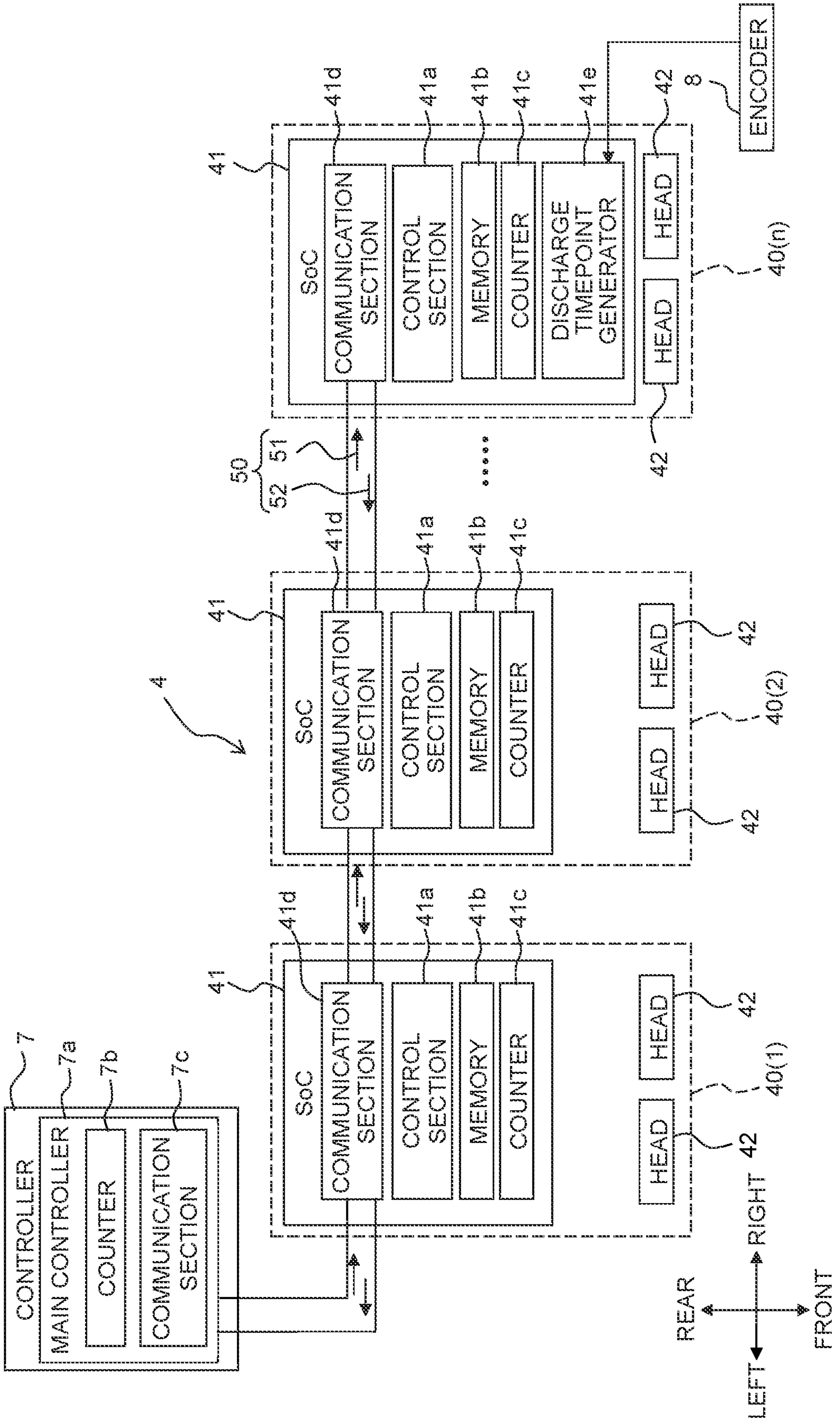
FIG. 4 is a block diagram of a controller, an encoder, and an ink jet head.

In the above description, the first communication path 51 and second communication path 52 are separate wirings. However, not only the separate wirings but also a single wiring can be used. For example, as depicted in FIG. 4, the available frequency bands in the first wiring 50 are divided, and the first frequency band can be used as the first communication path 51, and the second frequency band, which is different from the first frequency band, can be used as the second communication path 52.

Third Embodiment

The present disclosure will be described below based on drawings depicting a printer 1 according to a third embodiment. Configurations of the printer 1 according to the third embodiment that are similar to in the second embodiment will be assigned with the same symbols as in the second embodiment, and their detailed descriptions omitted.

A signal other than the discharge timepoint signal is transmitted from the head module 40 to the main controller 7*a*, through the second communication path 52. As a signal other than the discharge timepoint signal, there may be cited, for example, a signal indicating that reception of the image signal has been completed, or a signal indicating environmental temperature of the head module 40.

Figure 5:
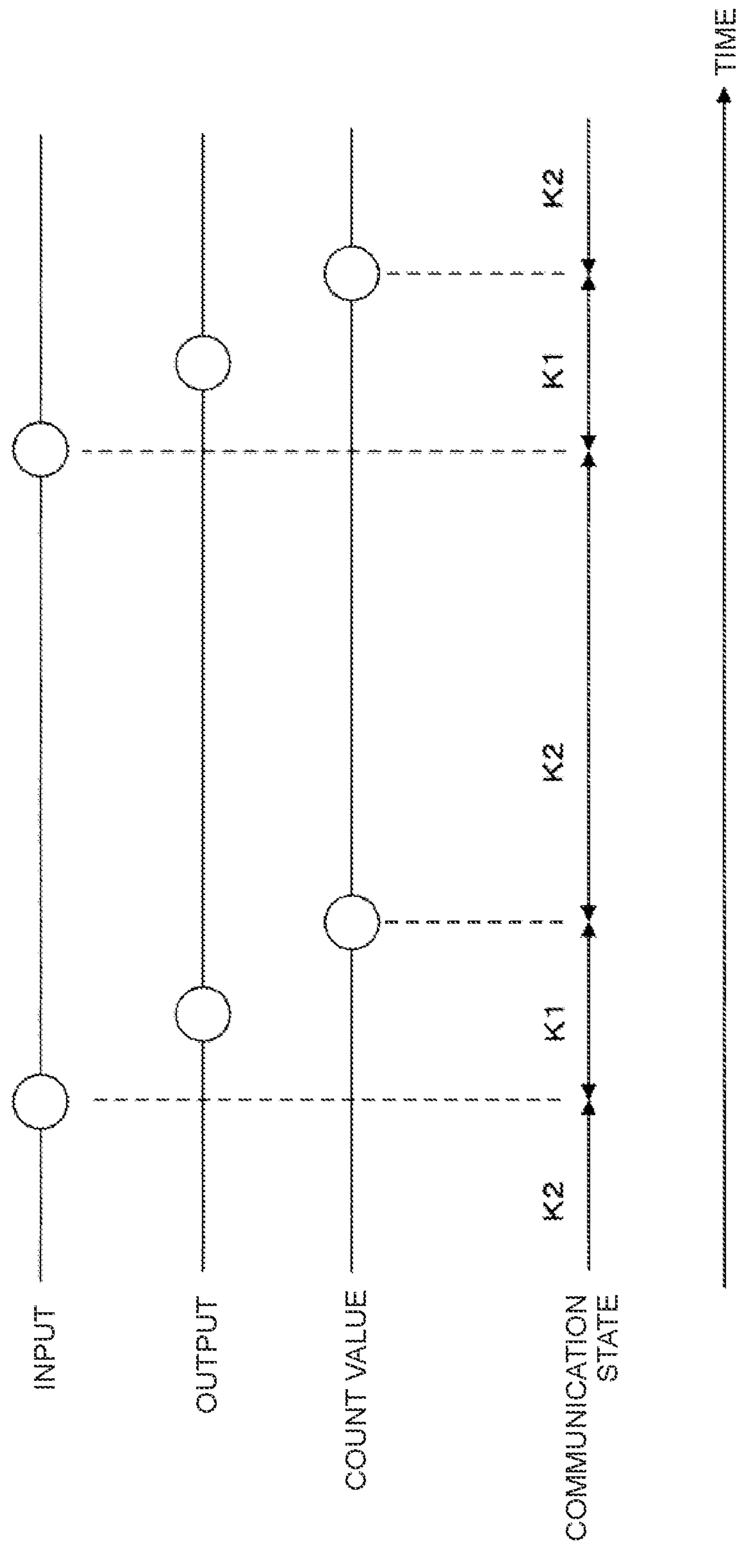
FIG. 5 is a timing chart of reception of a discharge timepoint signal into a head module, transmission of the discharge timepoint signal from the head module, count value of a counter, and communication state of a second communication path.

In FIG. 5, "reception" indicates a reception timepoint of the discharge timepoint signal into the head module 40, with the reception timepoint being represented by a circle. "Transmission" indicates a transmission (transfer) timepoint of the discharge timepoint signal from the head module 40, with the transmission timepoint being represented by a circle. "Count value" indicates a value that has been counted by the counter 41*c*, and in the present embodiment, the count value increases one at a time with 0 (zero) as an initial value. When the discharge timepoint signal is outputted from the head module 40, the counter 41*c* sets the count value to 0 (zero). "Communication state" indicates communication state of the second communication path 52, with K1 indicating a period of prohibition processing when transmission of a signal other than the discharge timepoint signal is prohibited, and K2 indicating a period when prohibition processing has been ended.

In the memory 41*b* of the head module 40, "98" is stored as a threshold value of the count value. The threshold value is predetermined based on a prediction that has been made of the reception timepoint of the discharge timepoint signal into the head module 40. For example, if the predicted reception timepoint is "99 onwards", then "98" which is earlier than "99" will be set as the threshold value.

Figure 6:
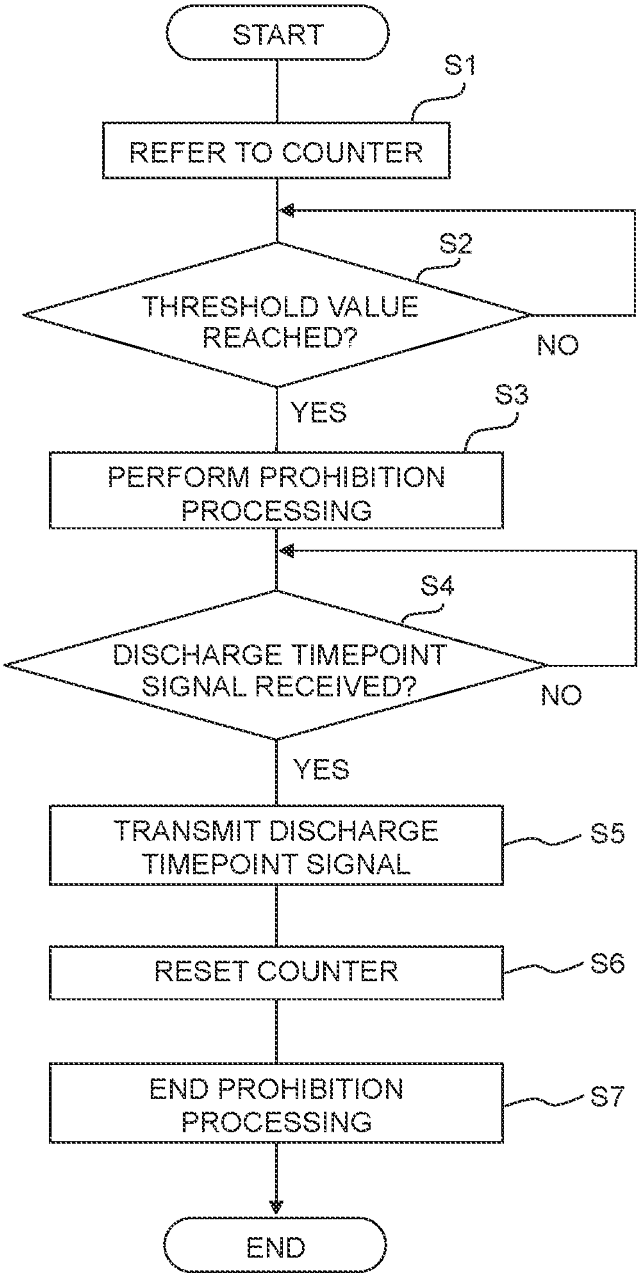
FIG. 6 is a flowchart explaining transmission control processing by an SoC.

FIG. 6 is a flowchart explaining transmission control processing by the SoC 41. The SoC 41 refers to the counter 41*c* (S1), and judges whether or not the count value reaches the threshold value "98" or more (S2). If the count value is not the threshold value "98" (S2: NO), then the SoC 41 returns processing to step S2.

If the count value reaches the threshold value "98" or more (S2: YES), then the SoC 41 executes prohibition processing prohibiting transmission of a signal other than the discharge timepoint signal (S3), and judges whether or not the discharge timepoint signal has been received (S4). If the discharge timepoint signal has not been received (S4: NO), then the SoC 41 returns processing to step S4. Note that the reception timepoint of the discharge timepoint signal is not necessarily fixed, and, as depicted in FIG. 5, is sometimes "99" and sometimes "100".

If the discharge timepoint signal has been received (S4: YES), then the SoC 41 transmits the discharge timepoint signal (S5) and resets the counter 41*c* (S6). As depicted in FIG. 5, the counter 41*c* is reset and count value becomes 0 (zero) at a time of transmission of the discharge timepoint signal. The SoC 41 ends prohibition processing (S7). A period from a timepoint when the count value has become "98" to the transmission timepoint of the discharge timepoint signal (timepoint when the count value becomes "0") is the period K1, and a period from the transmission timepoint of the discharge timepoint signal to a timepoint when the count value has become "97" is K2.

There is a risk that if the second communication path 52 is used by a signal other than the discharge timepoint signal, then said signal will be transmitted at the same timing as the discharge timepoint signal and a delay will occur in reception of the discharge timepoint signal in the head module 40. In the third embodiment, by prohibition processing prohibiting transmission of a signal other than the discharge timepoint signal being started prior to transmission of the discharge timepoint signal, that is, by the discharge timepoint signal being transmitted during the period K1 of prohibition processing and a signal other than the discharge timepoint signal being transmitted during the period K2 which is a different period from the period K1 and in which prohibition processing has been ended, occurrence of delay in reception of the discharge timepoint signal can be suppressed.

Fourth Embodiment

The present disclosure will be described below based on drawings depicting a printer 1 according to a fourth embodiment. Configurations of the printer 1 according to the fourth embodiment that are similar to in the third embodiment will be assigned with the same symbols as in the third embodiment, and their detailed descriptions omitted.

Figure 7:
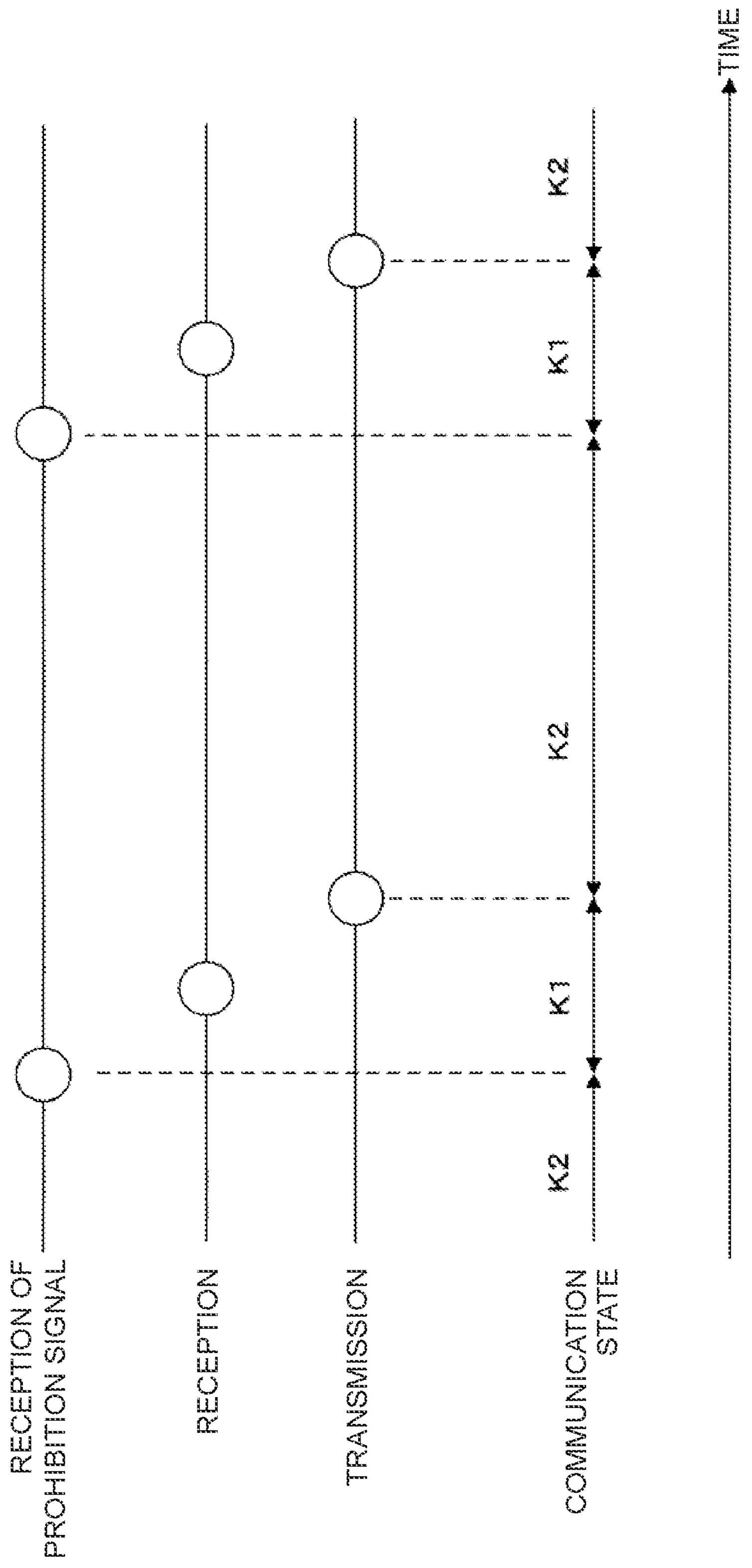
FIG. 7 is a timing chart of reception of a prohibition signal, transmission of a discharge timepoint signal to a head module, transmission of the discharge timepoint signal from the head module, and communication state of a second communication path.

"Reception", "transmission", and "communication state" in FIG. 7 are the same as in the third embodiment. "Reception of prohibition signal" indicates a timepoint when a signal sent from the discharge timepoint generator 41*e* indicating transmission of a signal other than the discharge timepoint signal is to be prohibited has been received, that is, when a prohibition signal has been received, with a reception timepoint being represented by a circle. The discharge timepoint generator 41*e* uses the second communication path 52 to transmit the prohibition signal to the head module 40 prior to transmitting the discharge timepoint signal. Note that a transmission timepoint of the discharge timepoint signal is determined as follows, for example. A transmission cycle of the discharge timepoint signal is predicted, and the transmission timepoint of the discharge timepoint signal is determined based on a predicted-time-point-of-transmission of the discharge timepoint signal specified from that transmission cycle. In this case, a timepoint which is earlier by as much as a maximum temporal error in transmission of the prohibition signal by the discharge timepoint generator and maximum temporal error in reception of the prohibition signal by the SoC 41, for example, is determined from the previously-described predicted-timepoint-of-transmission as the transmission timepoint of the discharge timepoint signal.

Figure 8:
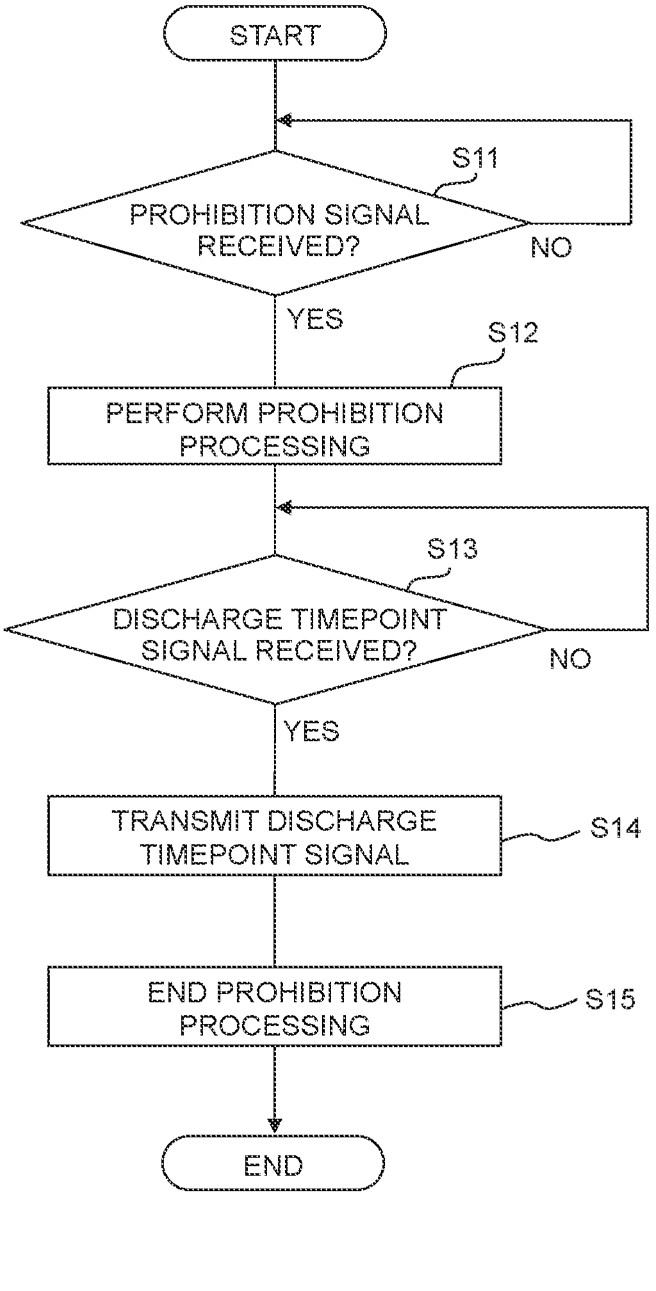
FIG. 8 is a flowchart explaining transmission control processing by an SoC.

As depicted in FIG. 8, the SoC 41 judges whether or not the prohibition signal has been received (S11). If the prohibition signal has not been received (S11: NO), then the SoC 41 returns processing to step S11. If the prohibition signal has been received (S11: YES), then the SoC 41 executes prohibition processing prohibiting transmission of a signal other than the discharge timepoint signal (S12), and judges whether or not the discharge timepoint signal has been received (S13). If the discharge timepoint signal has not been received (S13: NO), then the SoC 41 returns processing to step S13.

If the discharge timepoint signal has been received (S13: YES), then the SoC 41 transmits the discharge timepoint signal (S14) and ends prohibition processing (S15). A period from when the prohibition signal is received to when the discharge timepoint signal is transmitted is the period K1, and a period from when the discharge timepoint signal is transmitted to when the prohibition signal is received is the period K2.

In the fourth embodiment, by the prohibition signal being transmitted by the discharge timepoint generator 41*e* and by prohibition processing prohibiting transmission of a signal other than the discharge timepoint signal being started prior to transmission of the discharge timepoint signal, that is, by the discharge timepoint signal being transmitted during the period K1 of prohibition processing and a signal other than the discharge timepoint signal being transmitted during the period K2 which is a different period from the period K1 and in which prohibition processing has been ended, the discharge timepoint signal can be received by the SoC 41 during the period K1, and occurrence of delay in reception of the discharge timepoint signal can be suppressed.

The embodiments disclosed on this occasion are in all respects exemplifications, and should not be considered limiting. The technological features described in each of the embodiments can be combined with each other.

What is claimed is:

1. A head system comprising:

a main controller;

a plurality of head units including nozzles; and a plurality of sub-controllers respectively connected to at least one of the plurality of head units, each of the sub-controllers being serially connected via a wiring, wherein the wiring includes:

a first communication path configured to transmit an image signal; and a second communication path configured to transmit a discharge timepoint signal indicating a discharge timepoint when liquid is to be discharged from the nozzles, the second communication path differing from the first communication path, wherein the first communication path is configured to transmit the image signal from the main controller to each of the sub-controllers, wherein the second communication path is configured to transmit the discharge timepoint signal to each of the sub-controllers, and wherein each of the sub-controllers is configured to control one of the head units, to which each of the sub-controllers have been connected, to discharge liquid corresponding to an image indicated by the image signal that has been received through the first communication path from the nozzles of the one of the head unit, at a discharge timepoint indicated by the discharge timepoint signal that has been received through the second communication path.

2. The head system according to claim 1, wherein the first communication path is a first wiring connecting the main controller and each of the sub-controllers, and wherein the second communication path is a second wiring connecting each of the sub-controllers, and differing from the first wiring.

3. The head system according to claim 2, further comprising a detecting unit configured to detect a detection value;

wherein the plurality of the sub-controllers includes a first sub-controller and a second sub-controller, the first sub-controller including a discharge timepoint generator configured to generate the discharge timepoint signal based on the detection value and a second sub-controller not including the discharge timepoint generator, and wherein the first sub-controller is configured to transmit the discharge timepoint signal to the second sub-controller through the second wiring.

4. The head system according to claim 3, wherein the detection value is input to the discharge timepoint generator from the detecting unit, and wherein the first sub-controller including the discharge timepoint generator is positioned at a position closest to the detecting unit among all of the sub-controllers.

5. The head system according to claim 1, wherein the wiring is a bidirectional communication cable, wherein the first communication path in the bidirectional communication cable includes a first transmission start terminal positioned at one end of the bidirectional communication cable and a first transmission finish terminal positioned at another end of the communication cable, wherein the second communication path in the communication cable includes a second transmission start terminal positioned at the another end and a second transmission finish terminal positioned at the one end, wherein the main controller is connected to the first transmission start terminal and the second transmission finish terminal, wherein the plurality of sub-controllers includes a first sub-controller and a second sub-controller, wherein the first sub-controller is connected to the main controller via the first communication path and the second communication path, wherein the second sub-controller is connected to the first transmission finish terminal and the second transmission start terminal, wherein the image signal is sequentially transmitted to the first transmission start terminal, the first sub-controller, the first transmission finish terminal, and the second sub-controller from the main controller, through the first communication path, and wherein the discharge timepoint signal is sequentially transmitted to the second transmission start terminal, the first sub-controller, the second transmission finish terminal, and the main controller from the second sub-controller, through the second communication path.

6. The head system according to claim 5, wherein the first sub-controller includes a counter, and wherein the first sub-controller is configured to execute:

in a case of a value counted by the counter having reached a predetermined threshold value or more, prohibiting transmission of a signal other than the discharge timepoint signal through the second communication path;

after prohibiting transmission of a signal other than the discharge timepoint signal through the second communication path, transmitting and receiving the discharge timepoint signal through the second communication path; and after transmitting and receiving the discharge timepoint signal through the second communication path, resetting the counter, and ending prohibiting transmission of a signal other than the discharge timepoint signal through the second communication path.

7. The head system according to claim 5, wherein the second sub-controller is configured to transmit to others of each of the plurality of the sub-controllers a prohibition signal that prohibits transmission of a signal other than the discharge timepoint signal through the second communication path, wherein the other of the sub-controllers executes:

after reception of the prohibition signal, prohibiting transmission of a signal other than the discharge timepoint signal through the second communication path;

after prohibiting transmission of a signal other than the discharge timepoint signal through the second communication path, receiving and transmitting the discharge timepoint signal through the second communication path; and after receiving and transmitting the discharge timepoint signal through the second communication path, ending prohibiting transmission through the second communication path, of a signal other than the discharge timepoint signal.

8. The head system according to claim 5, wherein the wiring includes a first frequency band and a second frequency band that does not overlap the first frequency band, wherein the first communication path uses the first frequency band in the wiring and does not use the second frequency band in the wiring, and wherein the second communication path uses the second frequency band in the wiring and does not use the first frequency band in the wiring.

9. A liquid discharge device comprising:

the head system according to claim 1; and a conveyor configured to convey a recording medium.

10. A method of discharging liquid of a head system, the head system comprising:

a main controller;

a plurality of head units including nozzles; and a plurality of sub-controllers respectively connected to at least one of the plurality of head units, each of the sub-controllers being serially connected via a wiring, the wiring comprising:

a first communication path configured to transmit an image signal; and a second communication path configured to transmit a discharge timepoint signal indicating a discharge timepoint when liquid is to be discharged from the nozzles, the second communication path differing from the first communication path, the method of discharging liquid comprising:

causing the main controller to transmit the image signal to each of the sub-controllers through the first communication path;

causing one of the sub-controllers to transmit the discharge timepoint signal to others of the sub-controllers through the second communication path; and causing each of the sub-controllers to control one of the head units, to which each of the sub-controllers have been connected, to discharge liquid corresponding to an image indicated by the image signal that has been received through the first communication path from the nozzles of the one of the head units, at a discharge timepoint indicated by the discharge timepoint signal that has been received through the second communication path.

11. A method of discharging liquid of a head system, the head system comprising:

a main controller;

a plurality of head units having nozzles; and a plurality of sub-controllers respectively connected to at least one of the plurality of head units, each of the sub-controllers being serially connected via a wiring, the wiring comprising:

a first wiring sequentially connecting the main controller and each of the sub-controllers, the first wiring being configured to transmit an image signal; and a second wiring configured to transmit a discharge timepoint signal indicating a discharge timepoint when liquid is to be discharged from the nozzles, the second wiring sequentially connecting each of the sub-controllers and differing from the first wiring, the method of discharging liquid comprising:

causing the main controller to transmit the image signal to each of the sub-controllers through the first wiring;

causing one of the sub-controllers to transmit the discharge timepoint signal to others of the sub-controllers through the second wiring; and causing each of the sub-controllers to control one of the head units, to which each of the sub-controllers have been connected, to discharge liquid corresponding to an image indicated by the image signal that has been received through the first wiring from the nozzles of the one of the head units at a discharge timepoint indicated by the discharge timepoint signal that has been received through the second wiring.

12. The method of discharging liquid of the head system according to claim 11, wherein the wiring is a bidirectional communication cable including the first wiring and the second wiring, the first wiring including a first transmission start terminal positioned at one end of the bidirectional communication cable and a first transmission finish terminal positioned at another end of the bidirectional communication cable, the second wiring including a second transmission start terminal positioned at the another end and a second transmission finish terminal positioned at the one end, the main controller being connected to the first transmission start terminal and the second transmission finish terminal, the plurality of sub-controllers including a first sub-controller and a second sub-controller, controller, the first sub-controller is connected to the main controller via the first wiring and the second wiring, and the second sub-controller is connected to the first transmission finish terminal and the second transmission start terminal, the method of discharging liquid comprising:

causing the main controller to sequentially transmit the image signal to the first transmission start terminal, the first sub-controller, the first transmission finish terminal, and the second sub-controller, through the first wiring; and causing the second sub-controller to sequentially transmit the discharge timepoint signal to the second transmission start terminal, the first sub-controller, the second transmission finish terminal, and the main controller, through the second wiring.

* * * * *